United States Patent
Bonilla et al.

(10) Patent No.: US 9,882,363 B2
(45) Date of Patent: Jan. 30, 2018

(54) IN-USE WATER-TIGHT COUPLER FOR AN ELECTRICAL FLOOR BOX

(71) Applicant: Hubbell Incorporated, Shelton, CT (US)

(72) Inventors: Nelson Bonilla, Shelton, CT (US); Thomas L. Scanzillo, Monroe, CT (US); Scott Barry Wurms, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/474,282

(22) Filed: Mar. 30, 2017

(65) Prior Publication Data

US 2017/0288380 A1    Oct. 5, 2017

Related U.S. Application Data

(60) Provisional application No. 62/315,099, filed on Mar. 30, 2016.

(51) Int. Cl.
*H02G 3/08* (2006.01)
*H02G 3/18* (2006.01)
(Continued)

(52) U.S. Cl.
CPC .......... *H02G 3/185* (2013.01); *H01R 13/5219* (2013.01); *H02G 3/088* (2013.01); *H02G 3/14* (2013.01)

(58) Field of Classification Search
CPC ............ H02G 3/08; H02G 3/081; H02G 3/12; H02G 3/121; H02G 3/22; H02G 3/185; H02G 3/088; H02G 3/14; H05K 5/00; H05K 5/0004; H05K 5/02; H05K 5/0204; H05K 5/0247; H01R 13/5219; H01R 13/5221; H01R 13/46; H01R 13/52
USPC ....... 174/50, 53, 57, 58, 480, 481, 482, 483, 174/484, 486, 487, 490, 502, 503, 520, 174/559, 560, 561, 59; 220/3.2–3.9, 220/4.02; 439/535, 949; 52/220.1, 220.8
See application file for complete search history.

(56) References Cited

U.S. PATENT DOCUMENTS 4,284,312 A * 8/1981 Patchett ............ H01R 13/5219
                                                                439/677
5,270,490 A * 12/1993 Yang ..................... H02G 3/185
                                                                174/482

(Continued)

*Primary Examiner* — Angel R Estrada
(74) *Attorney, Agent, or Firm* — Michael Best & Friedrich, LLP

(57) ABSTRACT

An electrical floor box is configured to be electrically connected to an electrical cable that includes a cable terminal. The electrical floor box includes a surface plate oriented parallel to a floor surface. The surface plate includes an aperture. The electrical floor box also includes an electrical connector positioned in the aperture of the surface plate. The electrical connector includes a connector terminal that is configured to engage the cable terminal to provide an electrical connection therebetween. The electrical floor box further includes a sealing member positioned between the electrical connector and the aperture of the surface plate. The sealing member is configured to engage a portion of the electrical cable to provide a water-tight seal between the electrical cable and the connector terminal while the electrical cable is coupled to the electrical connector.

20 Claims, 15 Drawing Sheets

(51) Int. Cl.
*H01R 13/52* (2006.01)
*H02G 3/14* (2006.01)

(56) References Cited

U.S. PATENT DOCUMENTS

| | | | | |
|---|---|---|---|---|
| 7,189,921 B2* | 3/2007 | Andresen | ............... | H02G 3/086 |
| | | | | 174/50 |
| 8,416,572 B2* | 4/2013 | Olsen | ................... | H05K 7/2039 |
| | | | | 174/15.1 |
| 8,704,090 B2* | 4/2014 | Carbone | ................ | H02G 3/185 |
| | | | | 174/50 |
| 8,759,676 B1* | 6/2014 | Gretz | ..................... | H02G 3/185 |
| | | | | 174/50 |
| 9,035,201 B2* | 5/2015 | Jones | ....................... | H02G 3/12 |
| | | | | 174/482 |

* cited by examiner

IN-USE WATER-TIGHT COUPLER FOR AN ELECTRICAL FLOOR BOX

CROSS-REFERENCE TO RELATED APPLICATION

This application claims the benefit of prior-filed, U.S. Provisional Patent Application No. 62/315,099, filed Mar. 30, 2016, the entire contents of which are incorporated herein by reference.

BACKGROUND

The present disclosure relates to electrical floor boxes, and particularly to a water-tight coupling for electrical floor boxes.

SUMMARY

In one aspect, an electrical floor box is configured to be electrically connected to an electrical cable that includes a cable terminal. The electrical floor box includes a surface plate oriented parallel to a floor surface. The surface plate includes an aperture. The electrical floor box also includes an electrical connector positioned in the aperture of the surface plate. The electrical connector includes a connector terminal that is configured to engage the cable terminal to provide an electrical connection therebetween. The electrical floor box further includes a sealing member positioned between the electrical connector and the aperture of the surface plate. The sealing member is configured to engage a portion of the electrical cable to provide a water-tight seal between the electrical cable and the connector terminal while the electrical cable is coupled to the electrical connector.

In another aspect, an electrical floor box is configured to be electrically connected to an electrical cable that includes a cable terminal. The electrical floor box includes a surface plate oriented parallel to a floor surface. The surface plate includes a first aperture and a second aperture. The electrical floor box also includes a cover removably coupled to the surface plate to selectively cover one of the first and second apertures of the surface plate, and an electrical connector positioned in the first aperture of the surface plate. The electrical connector includes a connector terminal that is configured to engage the cable terminal to provide an electrical connection therebetween. The electrical floor box further includes a sealing member positioned between the electrical connector and the first aperture of the surface plate. The sealing member is configured to engage a portion of the electrical cable to provide a water-tight seal between the electrical cable and the connector terminal while the electrical cable is coupled to the electrical connector.

In yet another aspect, an electrical box is configured to be electrically connected to an electrical cable that includes a cable terminal. The electrical box includes a first housing having a first top surface and an open interior portion. The first top surface is oriented parallel to a floor surface such that a portion of the first housing extends below the floor surface. The electrical box also includes a second housing having a second top surface oriented parallel to the first top surface such that the second housing is received within the open interior portion of the first housing. The electrical box further includes a grate coupled to the first and second housings. The grate provides communication between the floor surface and the open interior portion of the first housing. The electrical box also includes an electrical connector coupled to the second housing. The electrical connector includes a connector terminal that is configured to engage the cable terminal to provide an electrical connection therebetween. The electrical box further includes a sealing member positioned between the electrical connector and the second housing providing a water-tight seal when the electrical cable is coupled to the electrical connector.

Other aspects of the invention will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
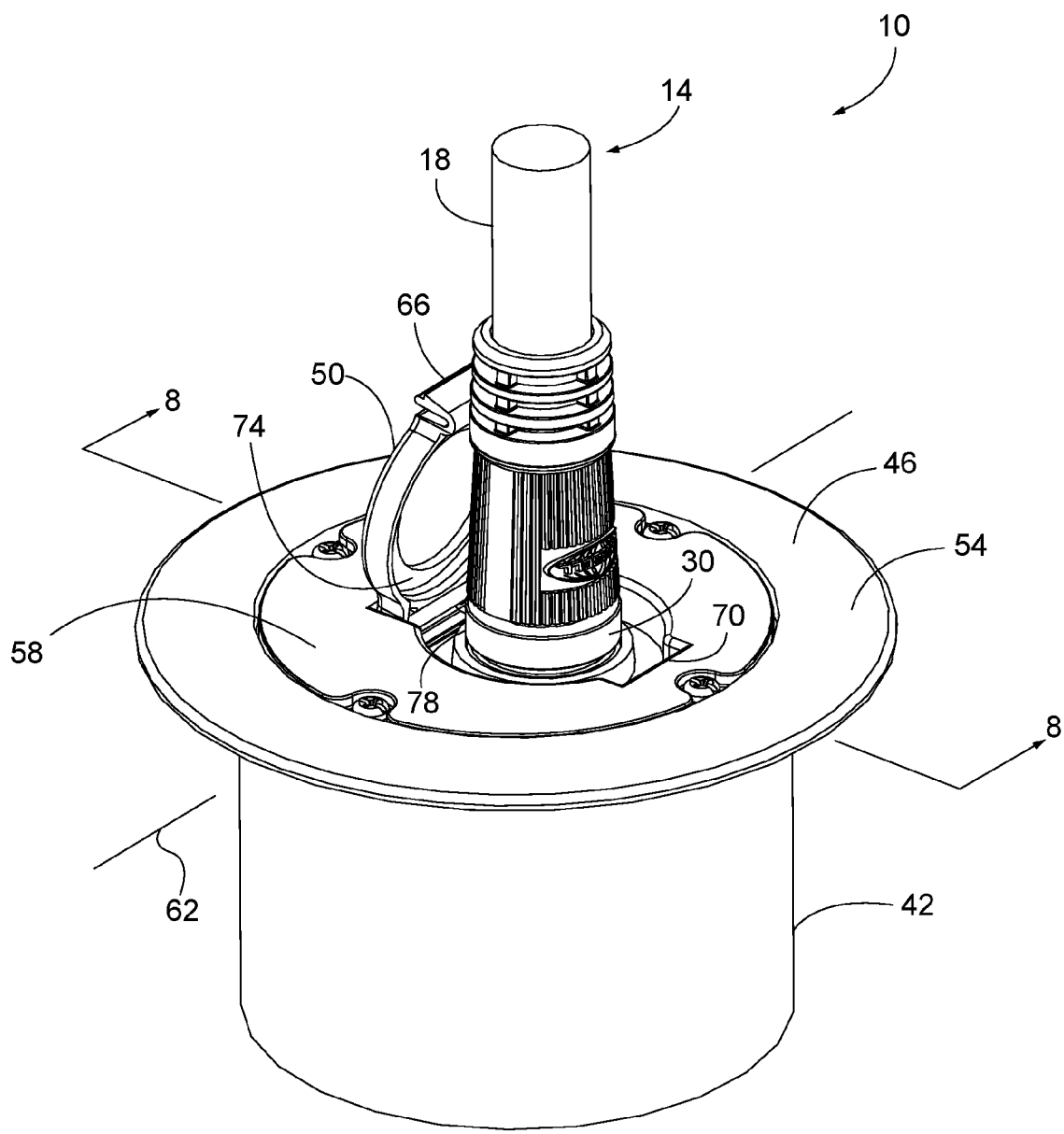
FIG. 1 is a perspective view of an electrical floor box that is electrically coupled to an electrical cable.
Figure 2:
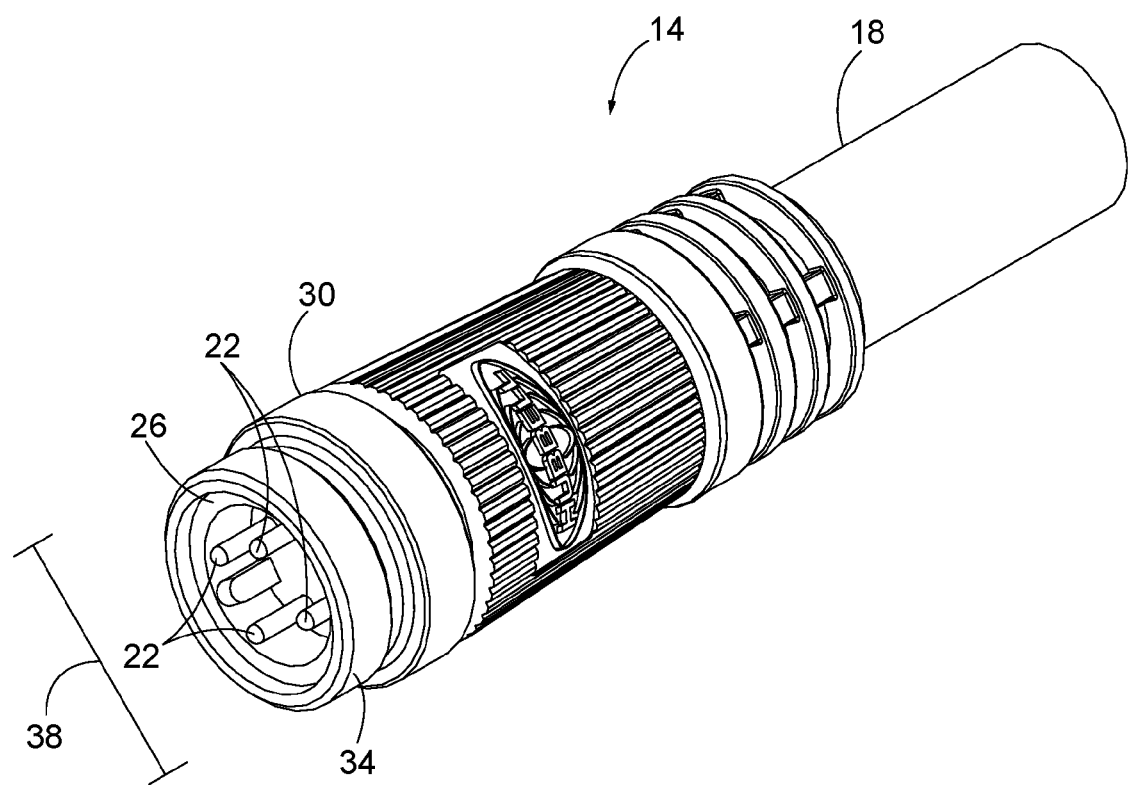
FIG. 2 is a perspective view of the electrical cable of FIG. 1.
Figure 3:
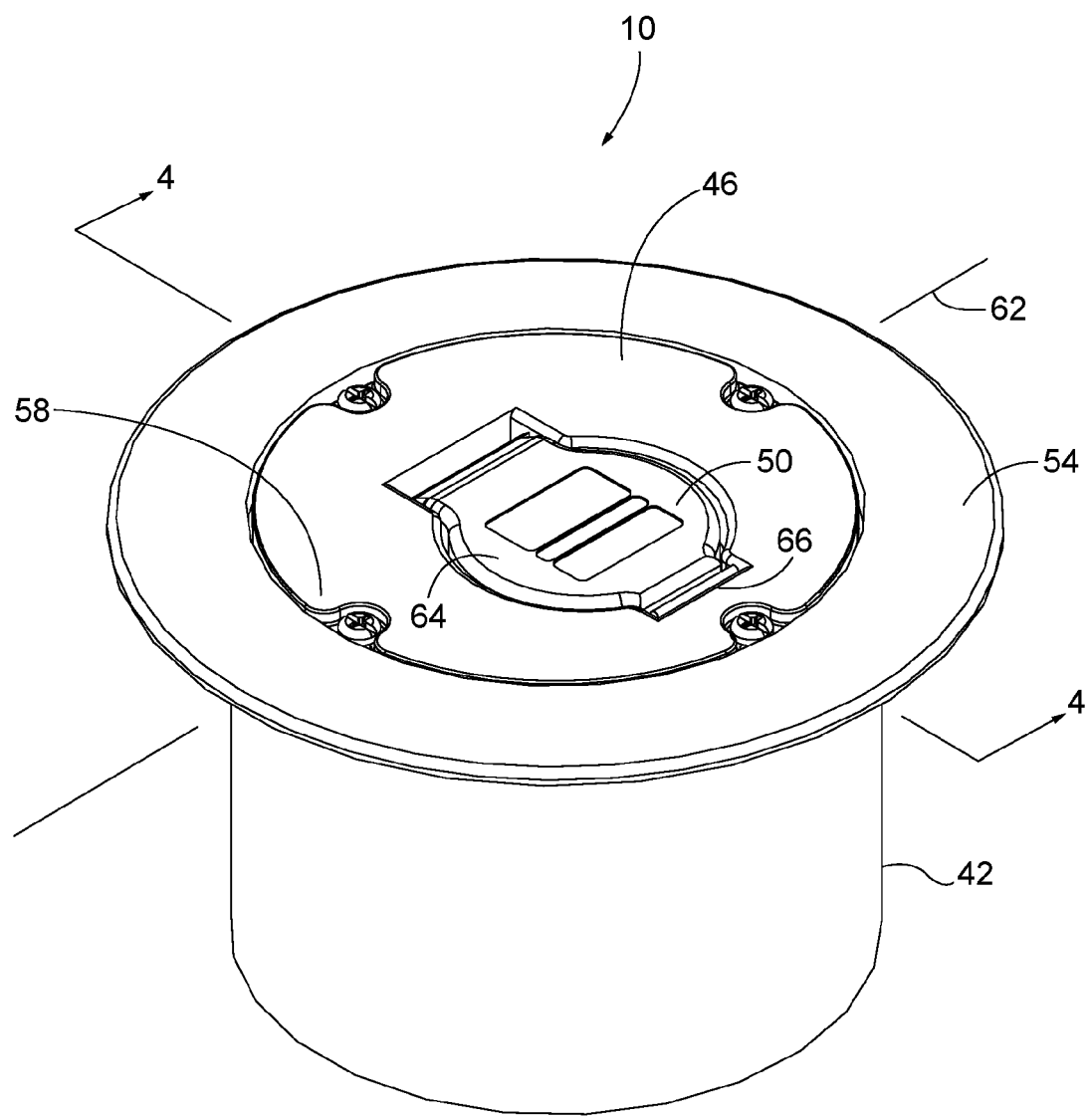
FIG. 3 is a perspective view of the electrical floor box of FIG. 1 with a cover in a closed position.

FIGS. 1-8 illustrate an electrical floor box 10 that is water resistant when an electrical cable 14 is coupled to the floor box 10 (FIG. 1) and is also water resistant when the electrical cable 14 is disconnected from the floor box 10 (FIG. 3). With reference to FIG. 2, the cable 14 includes a sheath 18 that electrically isolates first electrical terminals 22, an inner member 26, and an outer member 30. The first terminals 22 extend through and are fixed to the inner member 26 so that the inner member 26 inhibits movement of the first terminals 22 relative to each other. The illustrated outer member 30 is fixedly coupled to the inner member 26 and includes a circumferential surface 34 defining an outer diameter 38. In other embodiments, the cable 14 may be any other type of electrical cable that is configured to be connected with an electrical floor box.

With reference to FIG. 3, the electrical floor box 10 includes a first housing 42, a surface plate or second housing 46, and a cover 50. In the illustrated embodiment, the first housing 42 is inserted into a floor surface (e.g., a carpeted floor, a wood floor, a stone floor, and the like—not shown) such that a first top surface 54 is substantially co-planar with (or at least parallel to) the floor surface. The first housing 42 includes a flange, and the flange may be sealed to the floor surface with a sealing material (e.g., a gasket, caulk, or silicone). In the illustrated embodiment, the first housing 42 is substantially hollow; however, in other embodiments, the housing 42 may be substantially solid or partially solid. The illustrated surface plate 46 is fixed to the first housing 42 via fasteners and also includes a second top surface 58 that is substantially co-planar with the floor surface and the first top surface 54. In other embodiments, the first housing 42 and the surface plate 46 may be one-piece or integral members. The illustrated cover 50 is pivotably coupled to the surface plate 46 about an axis 62 between an open position, as illustrated in FIG. 1, and a closed position, as illustrated in FIG. 3.

Figure 4:
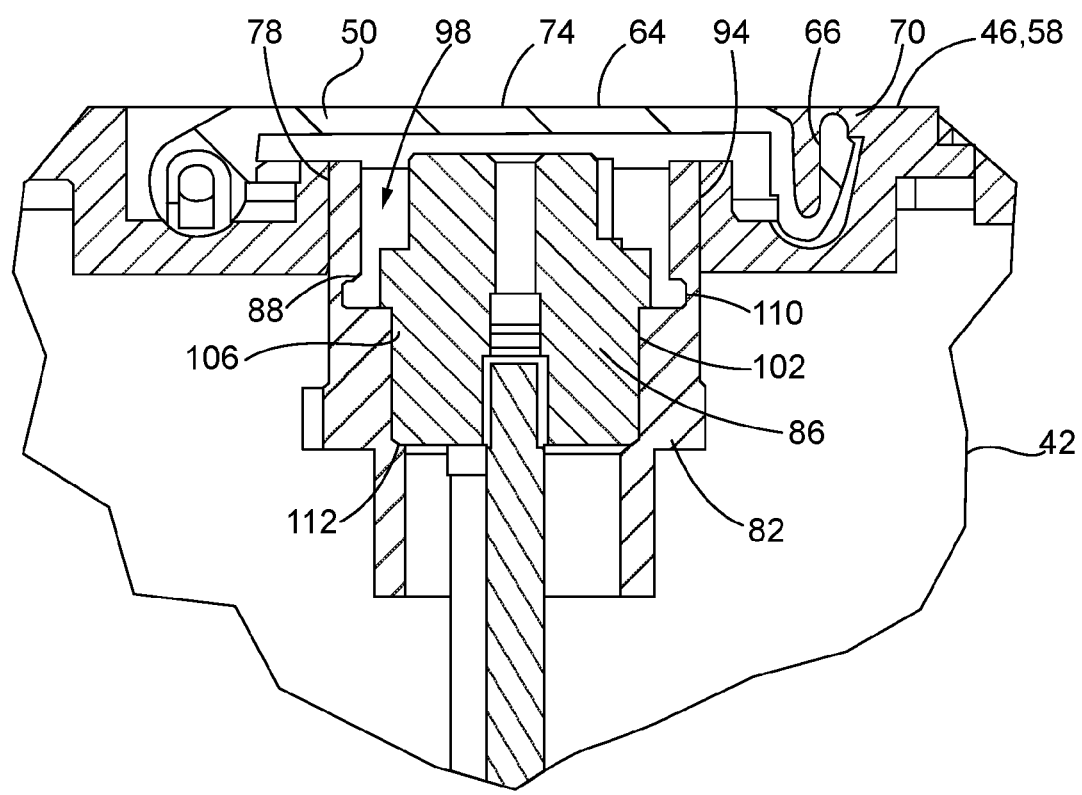
FIG. 4 is a cross sectional view of the electrical floor box of FIG. 3 taken along section 4-4 of FIG. 3.

As shown in FIG. 4, the cover 50 includes a third top surface 64 and a resilient tab or flange 66 that is configured to engage a protrusion 70 of the surface plate 46 (FIG. 4). The third top surface 64 is configured to be substantially co-planar with the first and second top surfaces 54, 58 when the cover 50 is in the closed position. In one embodiment, the cover 50 may be biased by a spring into the open position, and in other embodiments, the biasing spring may be omitted. A gasket 74 (e.g., an O-ring) is coupled to a bottom surface of the cover 50 and is configured to engage a portion of the surface plate 46 when the cover 50 is in the closed position. In other embodiments, the gasket 74 may be a solid disk.

With reference to FIG. 4, the surface plate 46 includes an aperture 78 with a sealing member or water-tight coupler 82 and an electrical connector 86 received therein. The electrical connector 86 includes a flange 88 coupling the electrical connector 86 to the sealing member 82, which is in turn fixed to the surface plate 46. The electrical connector 86 includes second electrical terminals 90 that are configured to engage the first electrical terminals 22 of the cable 14 (FIG. 2).

Figure 5:
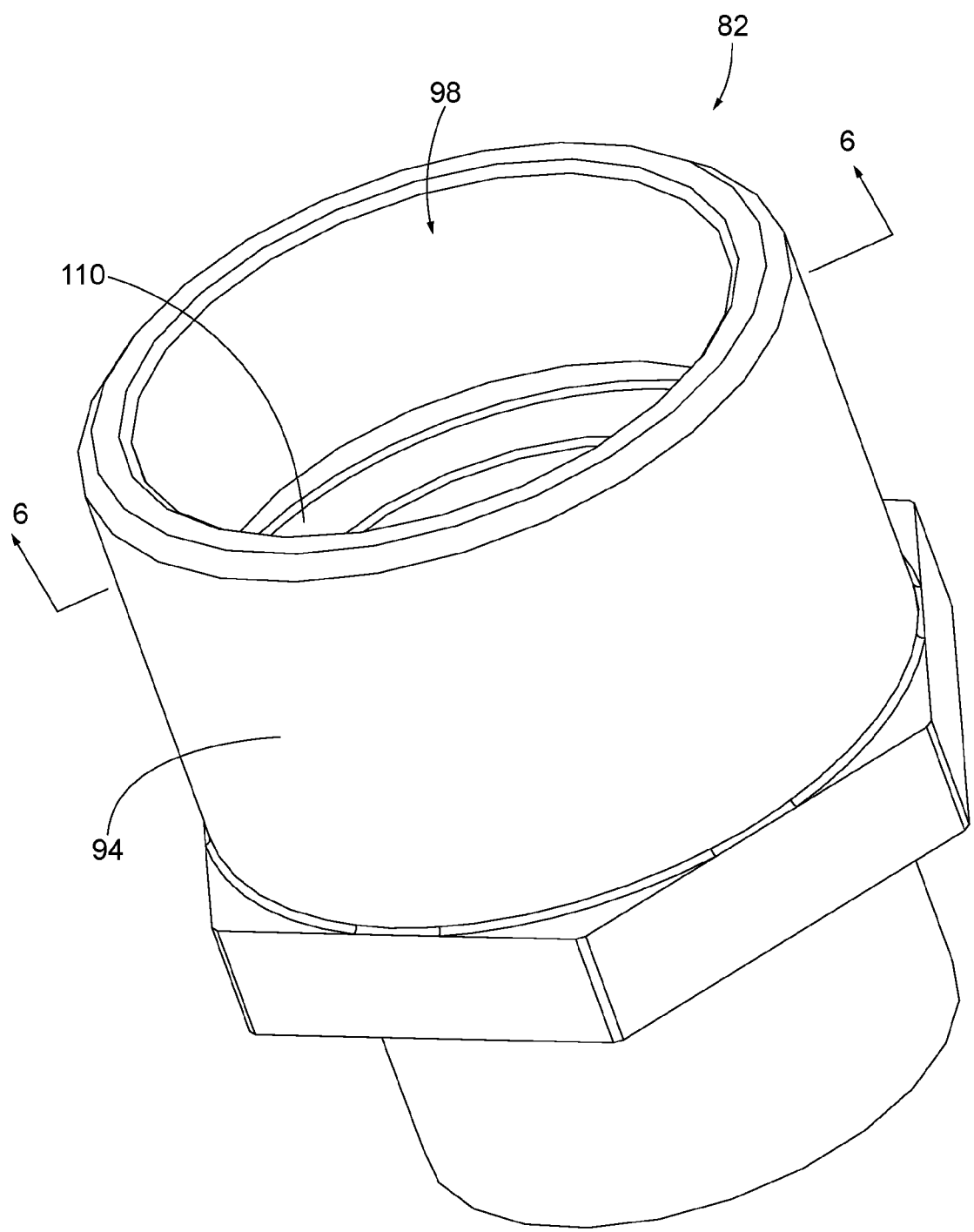
FIG. 5 is a perspective view of a sealing member.
Figure 6:
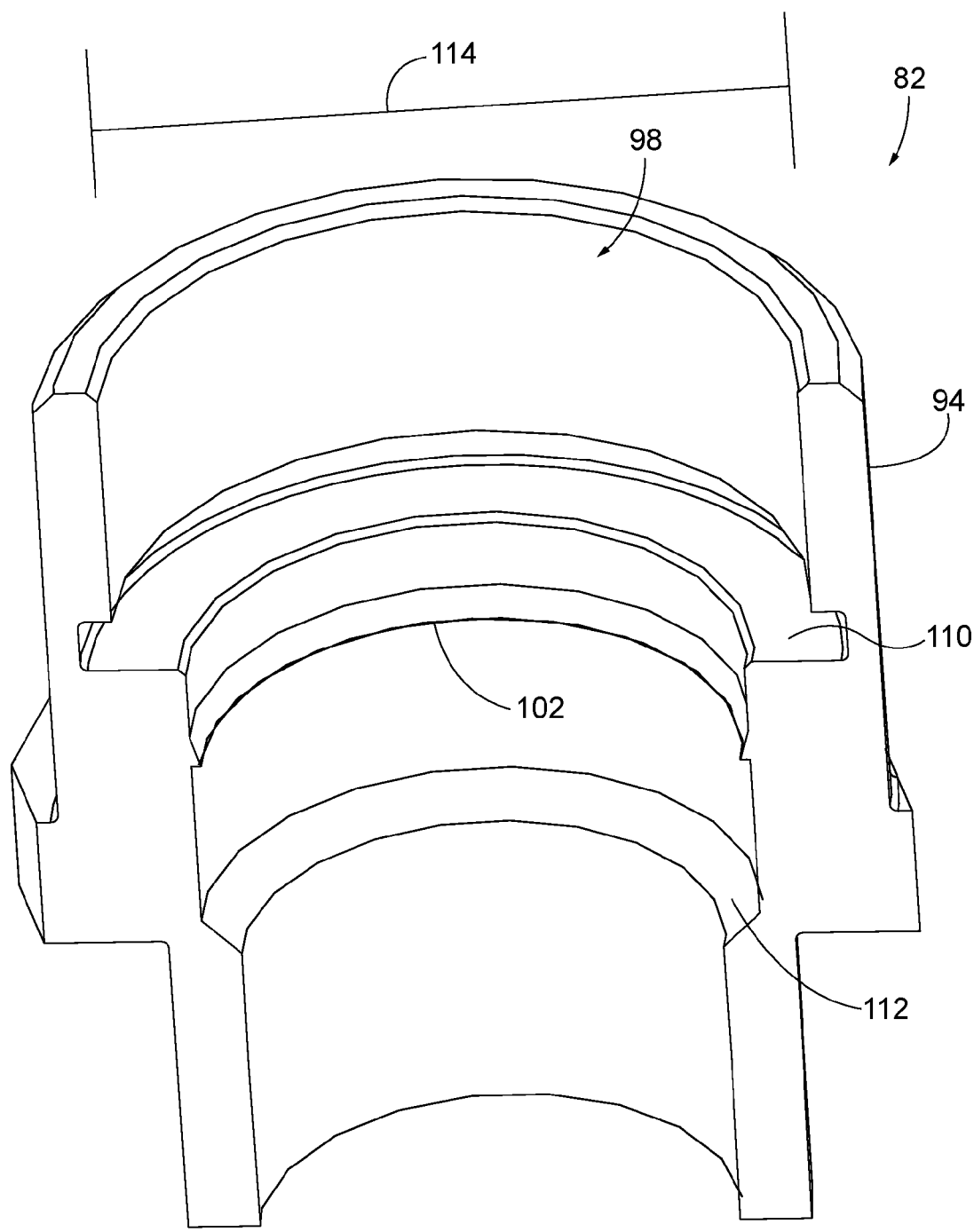
FIG. 6 is a cross sectional view of the sealing member of FIG. 5 taken along section 6-6 of FIG. 5.
Figure 7:
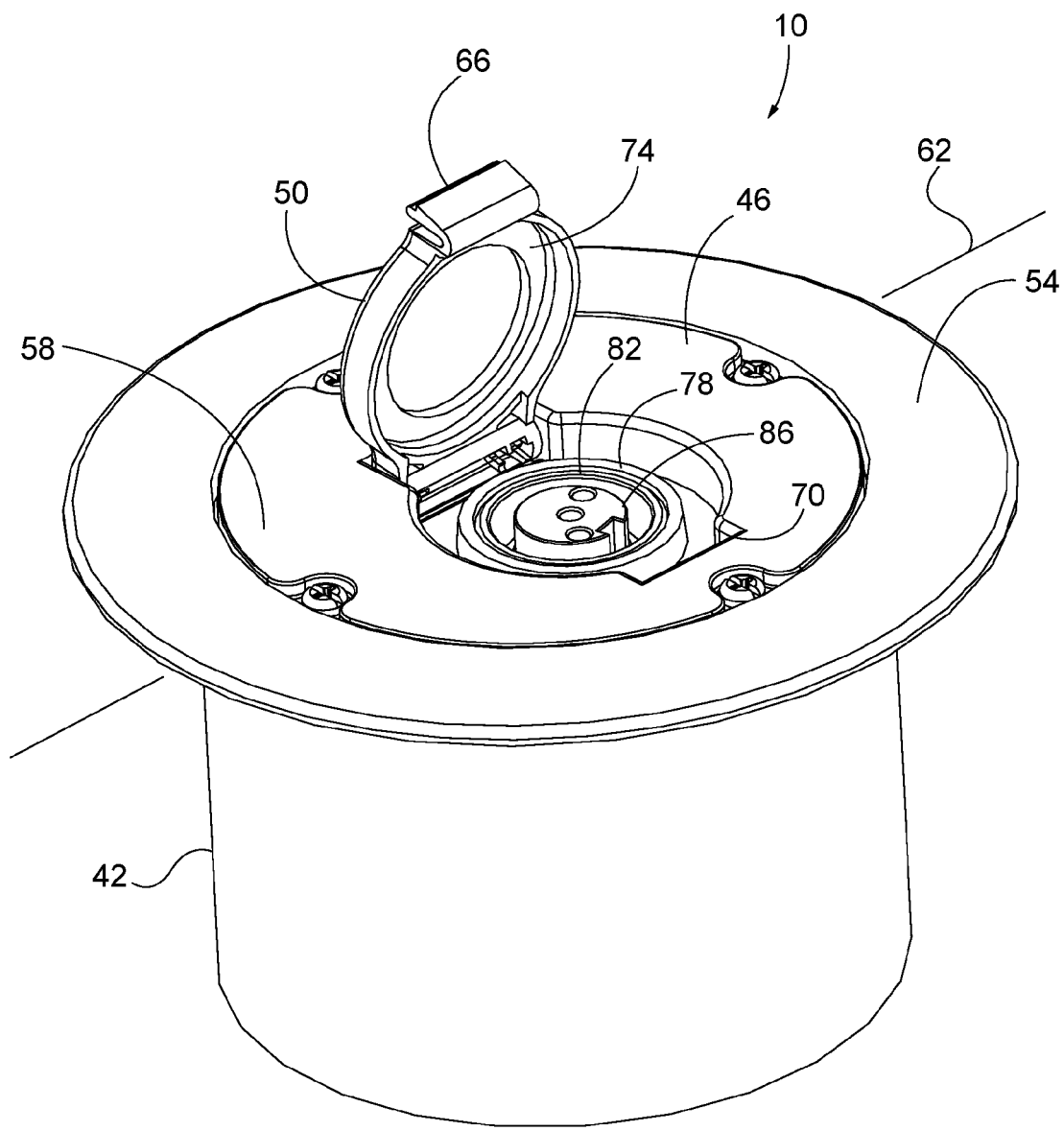
FIG. 7 is a perspective view of the electrical floor box of FIG. 1 with the cover in an open position.

As shown in FIGS. 4-6, the illustrated sealing member 82 includes an outer circumference 94 that abuts the aperture 78 as an interference fit. In other embodiments, the outer circumference 94 may be threadably engaged with the aperture 78. An inner portion 98 of the sealing member 82 includes a radial protrusion 102, a radial channel 110, and a chamfer 112. The radial protrusion 102 engages a groove 106 (FIG. 4) of the electrical connector 86 to inhibit the electrical connector 86 from sliding relative to the sealing member 82. In one embodiment, the radial channel 110 is configured to receive a gasket (e.g., an O-ring). The electrical connector 86 is seated within the sealing member 82 by abutting the chamfer 112 and by the flange 88 (FIG. 4) abutting the radial channel 110. The inner portion 98 also defines an inner diameter 114. In the illustrated embodiment, the sealing member 82 is made of a polymeric material. In other embodiments, the sealing member 82 may be made of a rubber material, metallic material, etc.

When the cover 50 is in the closed position (FIG. 3), the gasket 74 abuts portions of the surface plate 46 and/or the sealing member 82 to provide a first water-tight seal configuration. As such, the floor surface may be cleaned (e.g., utilizing a liquid cleaner) without damaging the electrical connector 86 and the second terminals 90. To move the cover 50 into the open position (FIG. 7), the resistant flange 66 is moved to disengage from the protrusion 70 of the surface plate 46. The cover 50 is then biased or manually moved into the open position.

Figure 8:
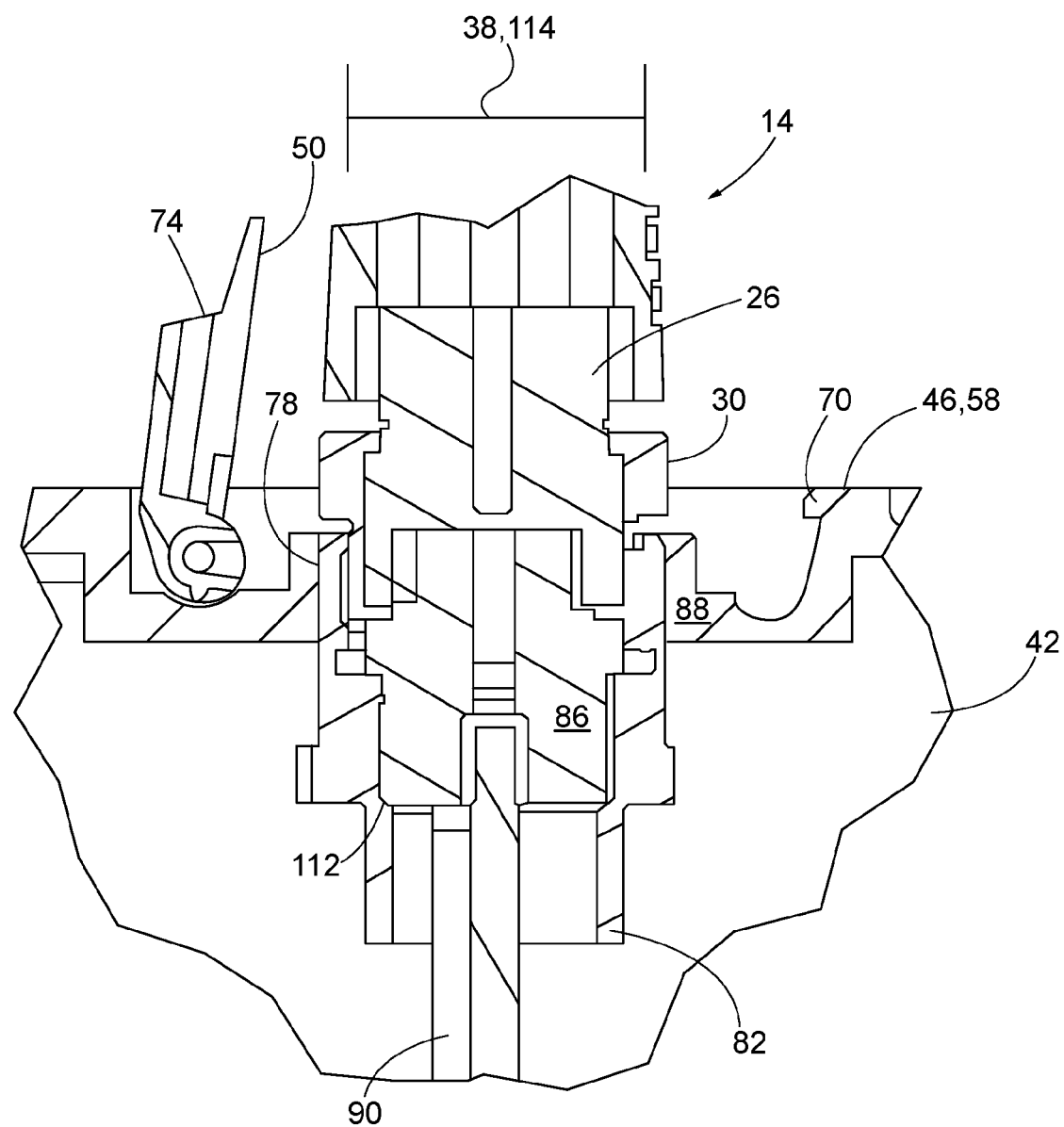
FIG. 8 is a cross sectional view of the electrical box of FIG. 7 taken along section 8-8 of FIG. 1.

With reference to FIG. 8, the cable 14 is inserted within the aperture 78 thereby providing a second water-tight seal configuration. In particular, the outer diameter 38 of the outer member 30 and the inner diameter 114 of the sealing member 82 are sized such that an interference fit is provided therebetween. In other embodiments, the outer member 30 may be coupled to the sealing member 82 differently. For example, the outer member 30 may threadably engage the sealing member 82, or the outer member 30 may provide a "snap" fit with the sealing member 82. In the embodiment with the gasket received within the radial channel 110, the gasket may abut the outer member 30 and at least one of the sealing member 82 and the electrical connector 86 to provide a water-tight seal. In further embodiments, the sealing member 82 may be positioned between the electrical connector 86 and the outer member 30 to provide a water-tight seal. As such, the floor surface may be also cleaned using a liquid cleaner without disconnecting the cable 14 from the floor box 10.

Figure 9:
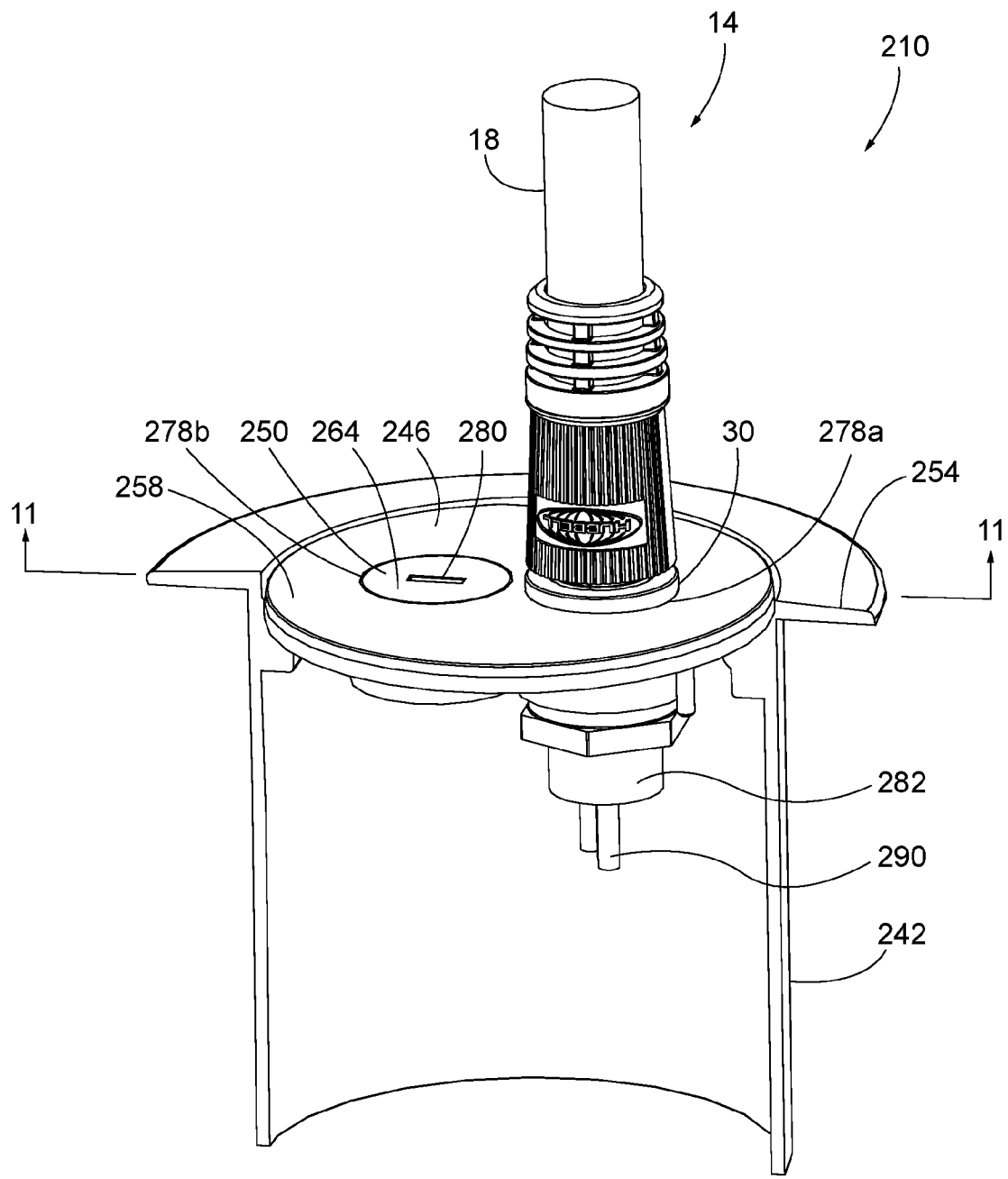
FIG. 9 is a perspective view of an electrical cable coupled to an electrical floor box according to another embodiment.
Figure 10:
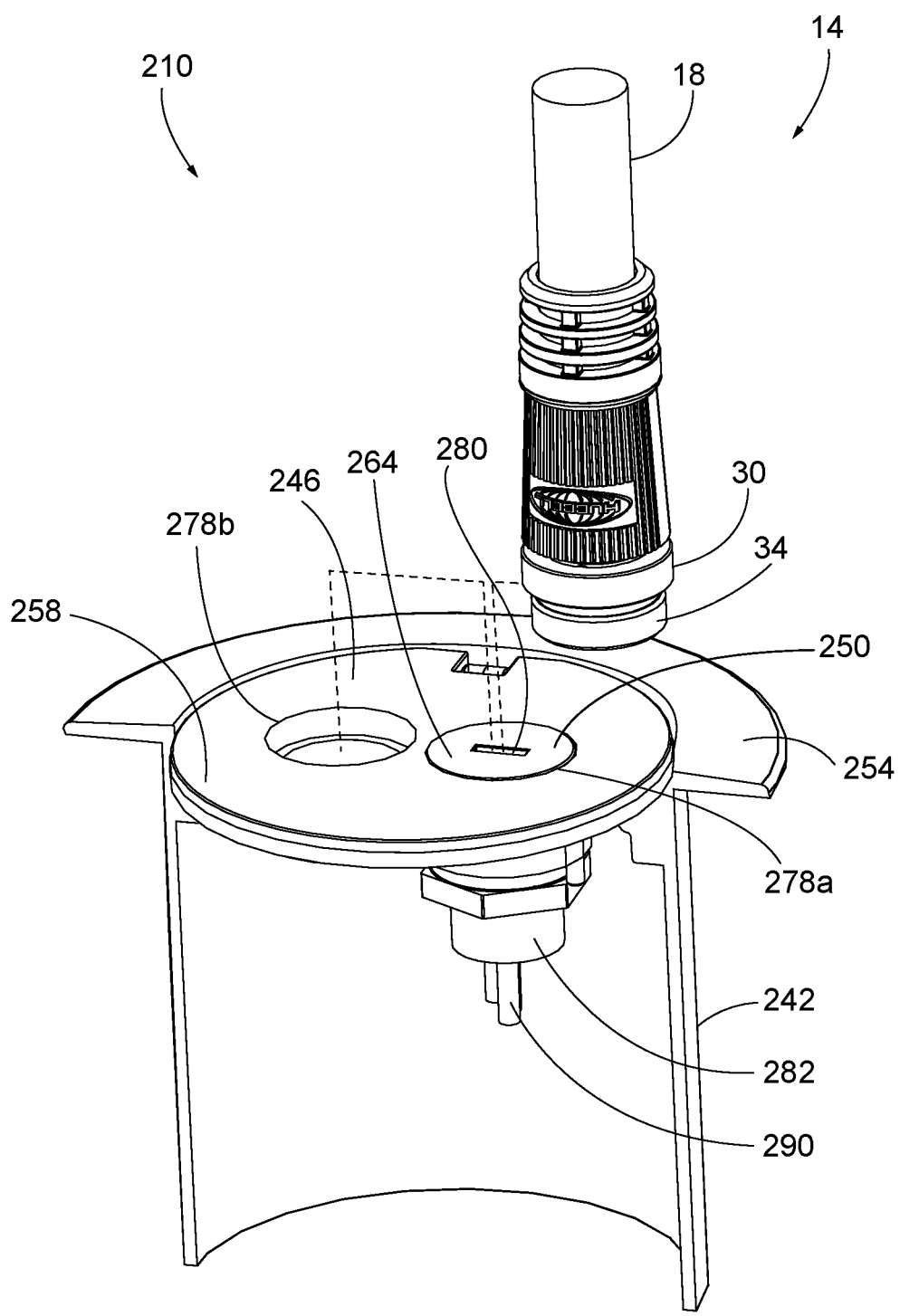
FIG. 10 is a perspective view of the electrical floor box of FIG. 9 electrically disconnected from the electrical cable.
Figure 11:
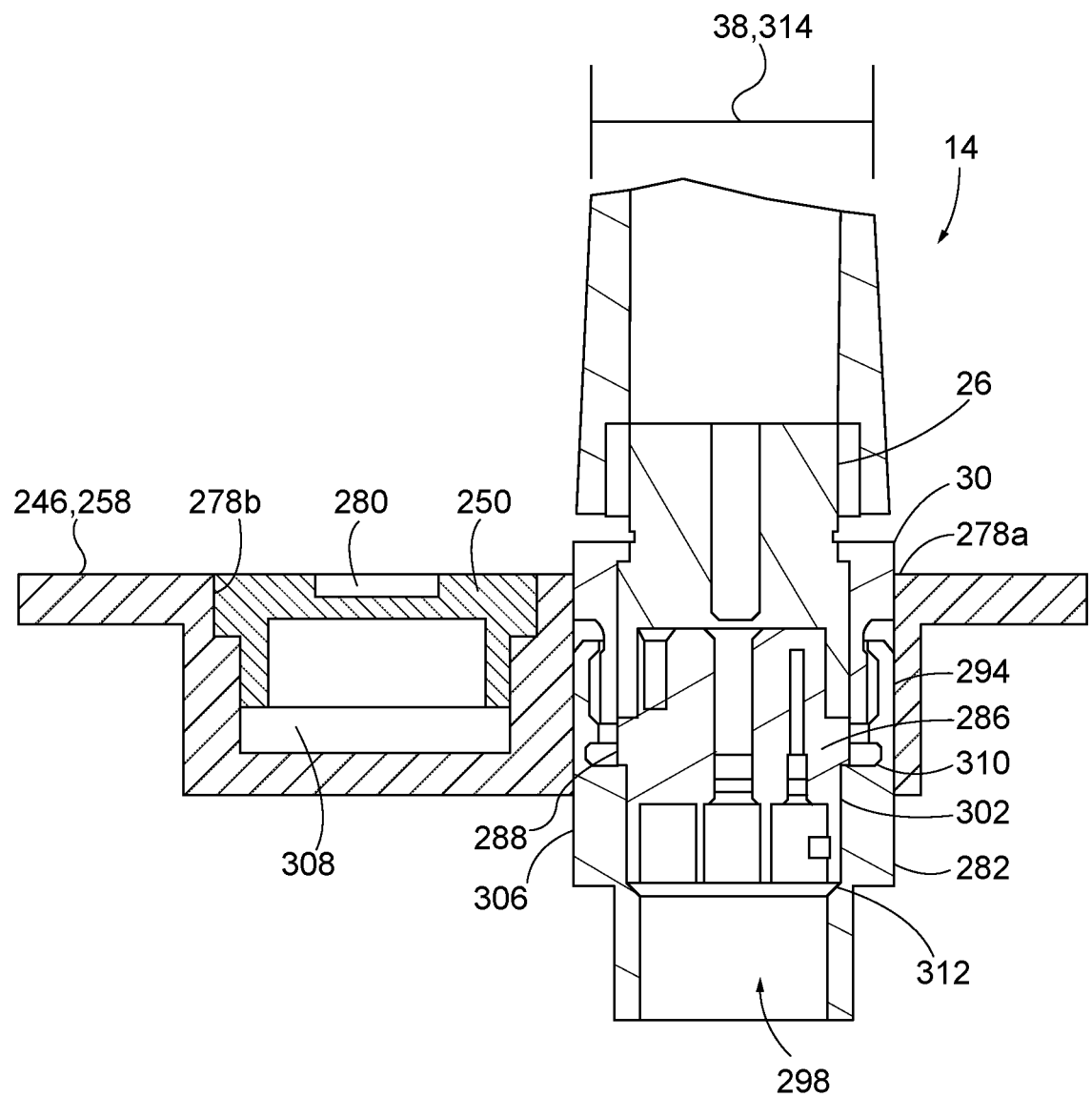
FIG. 11 is a cross sectional view of the electrical floor box of FIG. 9 taken along section 11-11 of FIG. 9.
Figure 12:
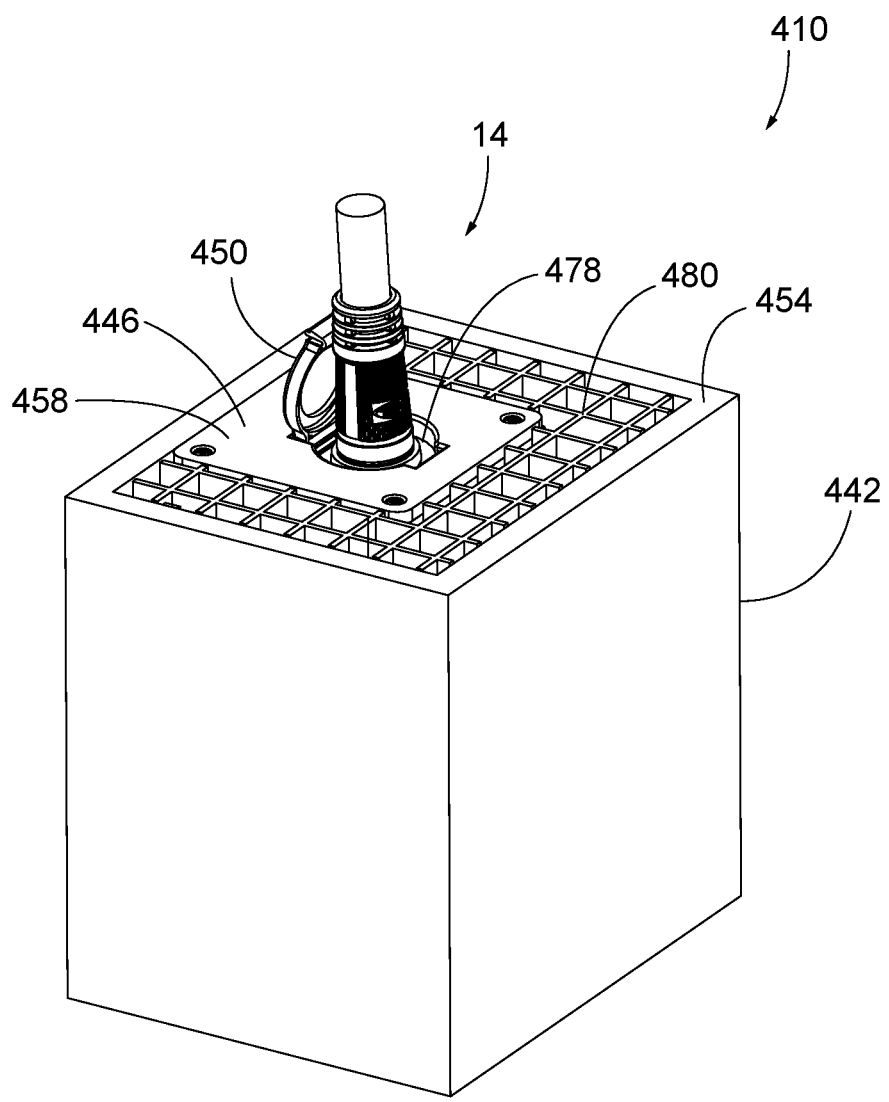
FIG. 12 is a perspective view of an electrical box according to another embodiment.
Figure 13:
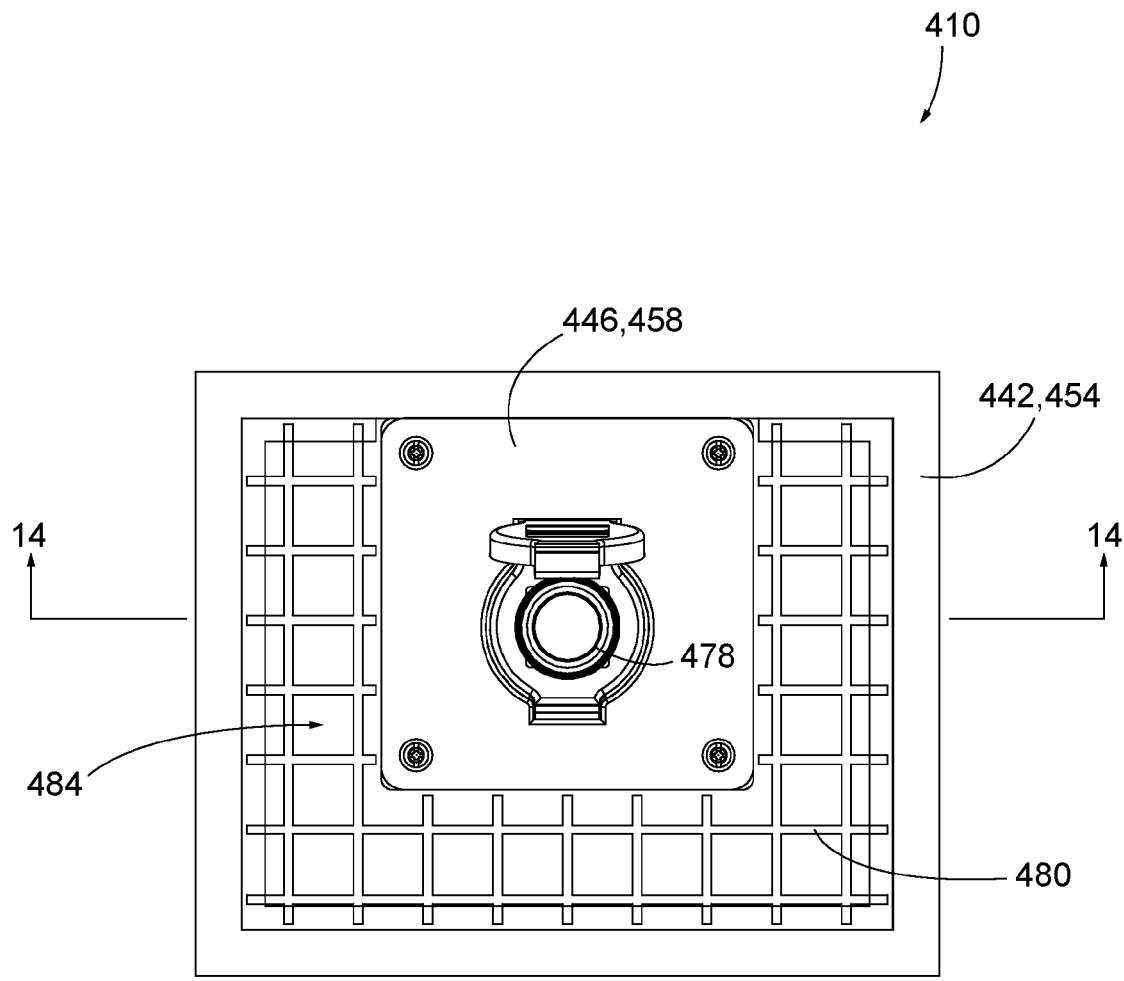
FIG. 13 is a top view of the electrical box of FIG. 12.

FIGS. 9-11 illustrate an electrical floor box 210 according to another embodiment. The electrical floor box 210 is similar to the electrical floor box 10; therefore, similar components have been given similar reference numbers, plus 200. Only differences between the electrical floor boxes 10, 210 will be discussed in detail. In addition, components or features described with respect to only one or some of the embodiments described herein are equally applicable to any other embodiments described herein.

The illustrated electrical floor box 210 includes a first housing 242 having a first top surface 254, a surface plate or second housing 246 having a second top surface 258, and a cover 250 having a third top surface 264. In the illustrated embodiment, the cover 250 is removably coupled to the surface plate 246, and the cover 250 may be completely separated from the surface plate 246. The illustrated surface plate 246 includes two apertures 278a, 278b that selectively receive the cover 250. In one embodiment, at least one of the apertures 278a, 278b may be threaded. The illustrated cover 250 includes a slot 280 that is configured to receive a tool (e.g., a flat-head screwdriver, a Phillips screwdriver, and the like).

With reference to FIG. 11, a sealing member 282, an electrical connector 286 having a flange 288, and second electrical terminals 290 are received within the aperture 278a. The illustrated sealing member 282 includes an outer circumference 294 that abuts the aperture 278a as an interference fit. An inner portion 298 of the sealing member 282 includes an inner diameter 314, a radial channel 310, a chamfer 312, and a radial protrusion 302 with the radial protrusion 302 engagable with a groove 306 of the electrical connector 286. The second aperture 278b is connected to a blind boss or blind hole 308 and provides a secure coupling for the cover 250 while the cable 14 is received in the first aperture 278a.

The cover 250 may be received with the aperture 278a to provide a first water-tight seal configuration while the floor surface is being cleaned. The cover 250 can be tightened or loosened by a tool. To connect the cable 14 with the electrical floor box 210, the cover 250 is removed from the aperture 278a and is then inserted within the aperture 278b. As such, the electrical connector 286 is exposed to connect the electrical terminals 22, 290 together by inserting the outer member 230 into the sealing member 282 to provide a second water-tight seal configuration while the floor surface is being cleaned.

FIGS. 12-15 illustrate an electrical box 410 according to another embodiment. The electrical box 40 may be adapted for outdoor or industrial applications. The electrical box 410 is similar to the electrical floor box 10; therefore, similar components have been given similar reference numbers, plus 400. Only differences between the electrical boxes 10, 410 will be discussed in detail. In addition, components or features described with respect to only one or some of the embodiments described herein are equally applicable to any other embodiments described herein.

The illustrated electrical box 410 includes an outer or first housing 442 having a first top surface 454, an inner or second housing 446 having a second top surface 458, and a cover 450. A grate 480 extends between the first top surface 454 and the second housing 446 with the second housing 446 attached to the grate 480 via fasteners. In other embodiments, the grate 480 may be selectively removable from the first housing 442 and/or the second housing 446. The illustrated grate 480 is substantially co-planar with the top surfaces 454, 458 and allows water (e.g., rain water) and other fluid or debris to enter an open interior portion 484 (FIG. 14) of the first housing 442. In the some embodiments (FIG. 15), the first housing 442 includes an open bottom opposite the grate 480 (e.g., a four-sided box). In other embodiments (FIG. 14), the bottom of the first housing 442 may be closed (e.g., a five-sided box) with at least one aperture located on the bottom surface of the first housing 442 opposite the grate 480.

Figure 14:
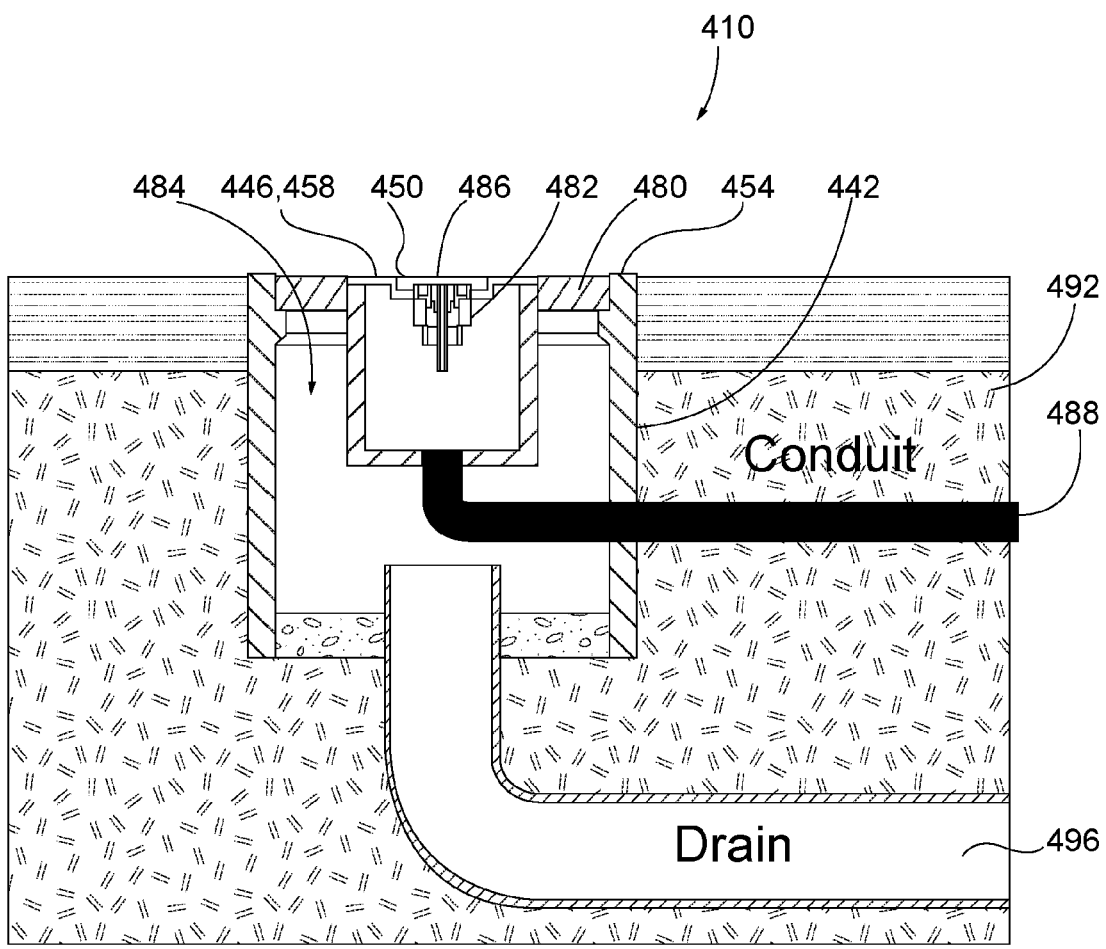
FIG. 14 is a cross sectional view of the electrical box of FIG. 13 taken along section 14-14 of FIG. 13 coupled to a drainage conduit.

The illustrated second housing 446 includes an aperture 478 that selectively receives the cable 14 similar to the electrical floor box 10. As shown in FIG. 14, in the illustrated embodiment, the second housing 446 is a box that encapsulates a sealing member 482 and an electrical connector 486. An electrical conduit 488 (FIG. 14) is coupled to a surface (e.g., a bottom surface) of the second housing 446 to receive and direct wiring of second electrical terminals 490 from the electrical connector 486 through the housings 442, 446 to a power source.

Figure 15:
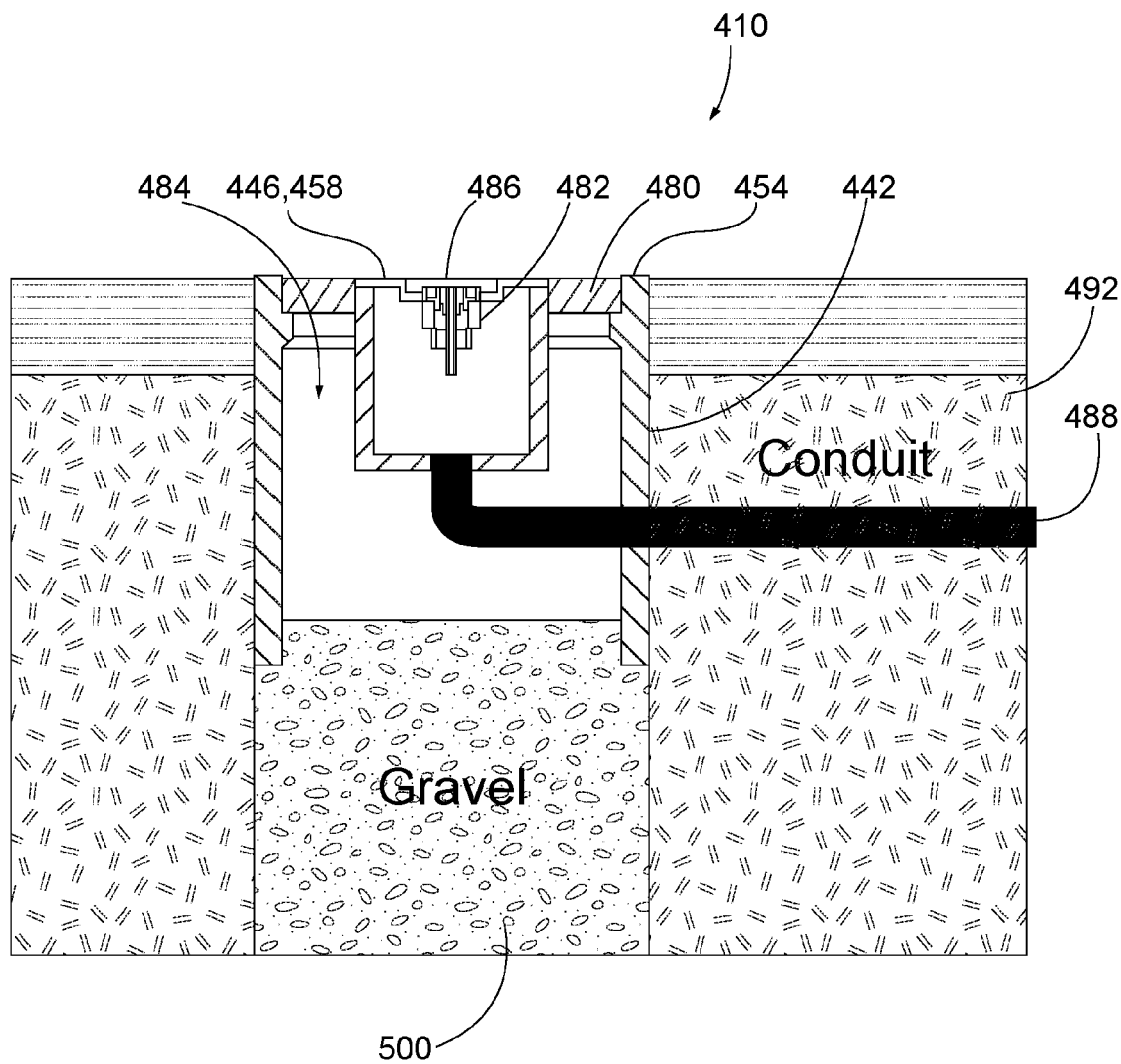
FIG. 15 is a cross sectional view of the electrical box of FIG. 13 taken along section 14-14 of FIG. 13 positioned above drainage gravel.

With reference to FIGS. 14 and 15, the electrical box 410 may be inserted into an outdoor surface 492 (e.g., a lawn, a sidewalk, a driveway, etc.) such that the housings 442, 446 are below the surface 492. The illustrated electrical box 410 is also positioned above a drainage conduit 496 (FIG. 14) and/or drainage gravel 500 (FIG. 15), which are both configured to remove or redirect water and debris away from the housings 442, 446 that collects within the open interior portion 484 through the grate 480.

Although aspects have been described in detail with reference to certain preferred embodiments, variations and modifications exist within the scope and spirit of one or more independent aspects as described.

The invention claimed is:
1. An electrical floor box configured to be electrically connected to an electrical cable, the electrical cable including a cable terminal, the electrical floor box comprising:
  a surface plate oriented parallel to a floor surface, the surface plate including an aperture;
  an electrical connector positioned in the aperture of the surface plate, the electrical connector including a connector terminal that is configured to engage the cable terminal to provide an electrical connection therebetween; and
  a sealing member positioned between the electrical connector and the aperture of the surface plate, the sealing member configured to engage a portion of the electrical cable to provide a water-tight seal between the electrical cable and the connector terminal while the electrical cable is coupled to the electrical connector.

2. The electrical floor box of claim 1, further comprising a housing coupled to and surrounding the surface plate, wherein the housing includes an upper surface generally oriented parallel to the surface plate.

3. The electrical floor box of claim 1, wherein the sealing member includes a diameter that is sized and configured to engage the electrical cable by an interference fit.

4. The electrical floor box of claim 1, wherein the sealing member includes a radial protrusion that engages a groove of the electrical connector to inhibit relative movement therebetween.

5. The electrical floor box of claim 1, further comprising a cover pivotally coupled to the surface plate to selectively cover the aperture of the surface plate, wherein the cover is moveable between a closed position and an open position.

6. The electrical floor box of claim 5, wherein the water-tight seal is a first water-tight seal that is provided between the electrical cable and the sealing member when the cover is in the open position and the electrical cable is coupled to the electrical connector.

7. The electrical floor box of claim 6, wherein the cover includes a gasket, and wherein the gasket engages a portion of the surface plate adjacent the aperture of the surface plate to provide a second water-tight seal when the cover is in the closed position.

8. The electrical floor box of claim 7, wherein the cover includes a resilient flange that engages a protrusion of the surface plate to maintain the cover in the closed position.

9. The electrical floor box of claim 1, wherein the sealing member includes an internal threaded portion configured to threadably engage a portion of the electrical cable.

10. The electrical floor box of claim 1, wherein the surface plate includes a second aperture and a cover, wherein the cover is selectively positioned in the second aperture when the electrical cable is connected to the electrical connector.

11. An electrical floor box configured to be electrically connected to an electrical cable, the electrical cable including a cable terminal, the electrical floor box comprising:
  a surface plate oriented parallel to a floor surface, the surface plate including a first aperture and a second aperture;
  a cover removably coupled to the surface plate to selectively cover one of the first and second apertures of the surface plate;
  an electrical connector positioned in the first aperture of the surface plate, the electrical connector including a connector terminal that is configured to engage the cable terminal to provide an electrical connection therebetween; and
  a sealing member positioned between the electrical connector and the first aperture of the surface plate, the sealing member configured to engage a portion of the electrical cable to provide a water-tight seal between the electrical cable and the connector terminal while the electrical cable is coupled to the electrical connector.

12. The electrical floor box of claim 11, further comprising a housing coupled to and surrounding the surface plate, wherein the housing includes a second top surface generally oriented parallel to the surface plate.

13. The electrical floor box of claim 11, wherein the sealing member includes a diameter that is sized and configured to engage the electrical cable by an interference fit.

14. The electrical floor box of claim 11, wherein the sealing member includes a radial protrusion that engages a groove of the electrical connector to inhibit relative movement therebetween.

15. The electrical floor box of claim 11, wherein the water-tight seal is a first water-tight seal that is provided between the electrical cable and the sealing member when the electrical cable is coupled to the electrical connector.

16. The electrical floor box of claim 15, wherein a second water-tight seal is provided between the cover and the first aperture of the surface plate when the cover is coupled to the first aperture.

17. The electrical floor box of claim 11, wherein the cover is received within the second aperture of the surface plate to allow the electrical cable to be connected with the electrical connector.

18. The electrical floor box of claim 11, wherein the cover includes a top surface that is oriented parallel to the top surface of the surface plate when the cover is received within one of the first and the second apertures.

19. An electrical box configured to be electrically connected to an electrical cable, the electrical cable including a cable terminal, the electrical box comprising:
   a first housing including a first top surface and an open interior portion, the first top surface oriented parallel to a floor surface such that a portion of the first housing extends below the floor surface;
   a second housing including a second top surface oriented parallel to the first top surface such that the second housing is received within the open interior portion of the first housing;
   a grate coupled to the first and second housings, the grate providing communication between the floor surface and the open interior portion of the first housing;
   an electrical connector coupled to the second housing, the electrical connector including a connector terminal that is configured to engage the cable terminal to provide an electrical connection therebetween; and
   a sealing member positioned between the electrical connector and the second housing providing a water-tight seal when the electrical cable is coupled to the electrical connector.

20. The electrical floor box of claim 19, wherein the open interior portion of the first housing is configured to be in communication with one of a drainage conduit and drainage gravel located below the second housing.

* * * * *